Figure 1:
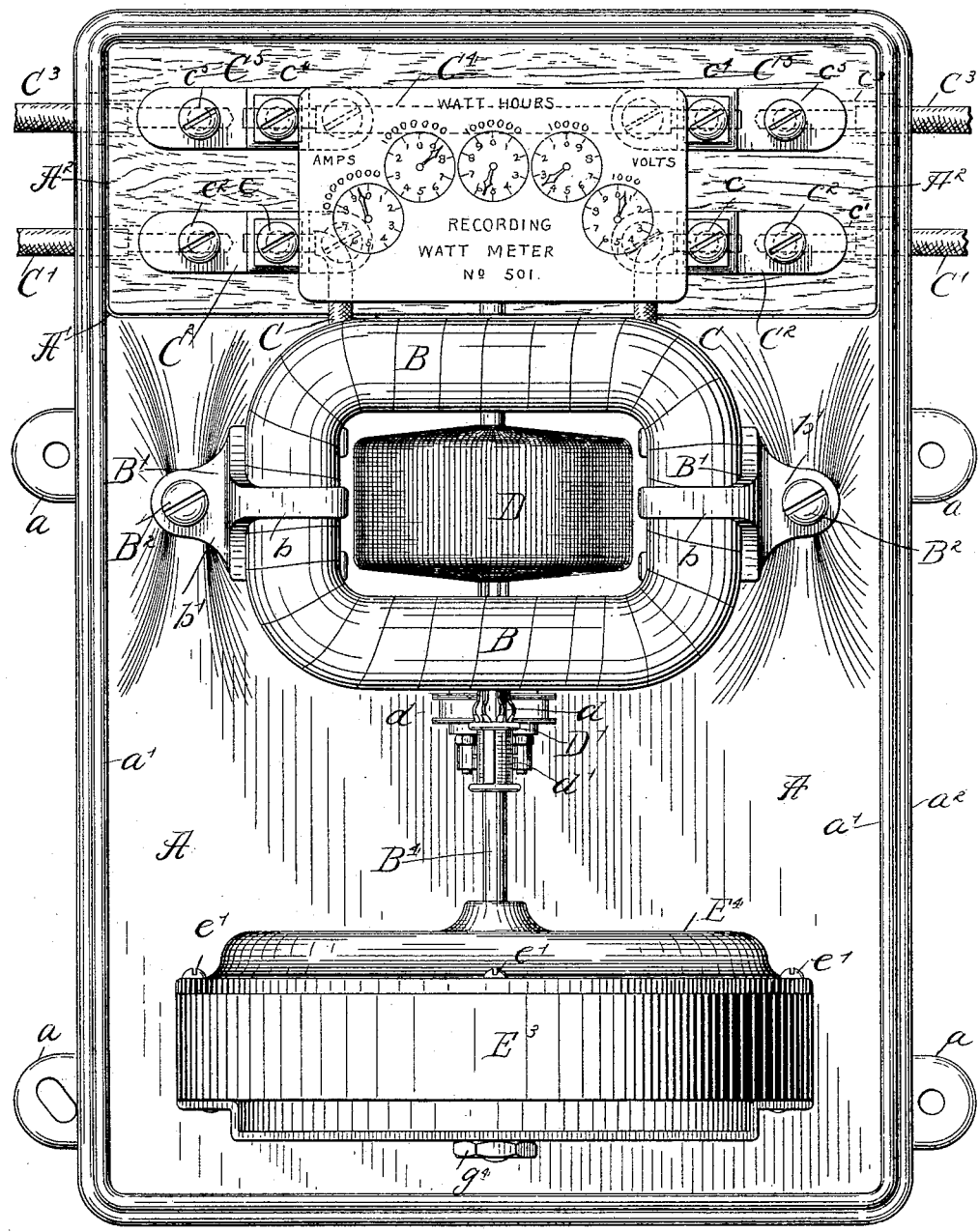

(No Model.)  5 Sheets—Sheet 1.

T. DUNCAN.
METER FOR MEASURING ELECTRIC CURRENTS.

No. 573,079.  Patented Dec. 15, 1896.

Witnesses  Inventor
  Thomas Duncan
 By his Attorneys (No Model.) 5 Sheets—Sheet 3.

T. DUNCAN.
METER FOR MEASURING ELECTRIC CURRENTS.

No. 573,079. Patented Dec. 15, 1896.

Witnesses
Inventor
Thomas Duncan
By his Attorneys
Parkinson & Carter (No Model.) 5 Sheets—Sheet 4.

T. DUNCAN.
METER FOR MEASURING ELECTRIC CURRENTS.

No. 573,079. Patented Dec. 15, 1896.

Witnesses

Inventor
Thomas Duncan
By his Attorneys
Parkinson & Carter (No Model.)

T. DUNCAN.
METER FOR MEASURING ELECTRIC CURRENTS.

No. 573,079.  Patented Dec. 15, 1896.

Witnesses
F. L. Sessums
Lewis P. Abell

Inventor
Thomas Duncan
By his Attorneys
Parkins and Carter

UNITED STATES PATENT OFFICE.

THOMAS DUNCAN, OF FORT WAYNE, INDIANA.

METER FOR MEASURING ELECTRIC CURRENTS.

SPECIFICATION forming part of Letters Patent No. 573,079, dated December 15, 1896.

Application filed May 7, 1896. Serial No. 590,512. (No model.)

*To all whom it may concern:*

Be it known that I, THOMAS DUNCAN, a citizen of the United States, residing at Fort Wayne, in the county of Allen and State of Indiana, have invented certain new and useful Improvements in Meters for Measuring Electric Currents, of which the following is a specification.

This invention relates, primarily, to the construction and mode of operating meters for direct or alternating currents, and particularly to that class known as "integrating wattmeters."

It relates, further, to magneto-electric brakes or retarding devices for use in such meters or wherever a damper is required, the drag of which is proportional to the speed and to the square of the magnetic field.

A drawback existing in connection with meters now upon the market is that the magnets of the brake are exposed to the disturbing and detrimental influences of the leads or mains entering the meter and of the lines of force emanating from the field-magnets, which tend to vary their strength and in time to weaken them, especially when measuring alternating currents, always strongly demagnetizing in their effect. Age alone also weakens the permanent magnets of the brake, particularly, as they have heretofore been used, without any auxiliary analogous to a keeper. The result of these disturbing influences is that the brake is irregular and not strictly reliable in its action and when the magnets become weakened the meter runs too fast, that is to say, when first made and installed the meter probably registers correctly, but if tested six months later it will invariably be found to have gained over-speed, involving the trouble and unavoidable necessity of restandardizing it at the cost of considerable time and expense.

To guard against the noxious influences of external fields or sources of magnetism, such as the leads and the series coils, I have heretofore proposed, in Letters Patent granted me on the 3d day of December, 1895, No. 550,823, to interpose a magnetic medium or shield between the drag or damping magnets and such external fields or sources, adapted to receive the stray lines of magnetism therefrom and thereby protect said magnets. This shield, however, while warding off external influences, did not enter into such relations with the permanent magnets, when used, as to act as a conservator of their strength or prevent the decadence due to age.

In the present improvement the magnetic shield is disposed in such manner that it may serve, practically, as a keeper through which the lines of force emanating from the magnets complete their circuit to the adjacent poles. In the approved form of the invention this shield is made as a fixed ring of iron or steel surrounding the damping-magnets, which are placed radially to and revolve about a concentric axis, with their outsetting poles in close proximity to the inner surface of the ring. Preferably, also, a stationary ring of copper or aluminium is interposed between the magnetic ring and the proximate poles of the magnets, so that strong eddy-currents may be induced in said intermediate ring by the conjoint action of the magnets and outer or magnetic ring when the apparatus is in motion.

Improvements of detail in the meter and brake will appear from the following description and by reference to the accompanying drawings, in which—

Figure 2:
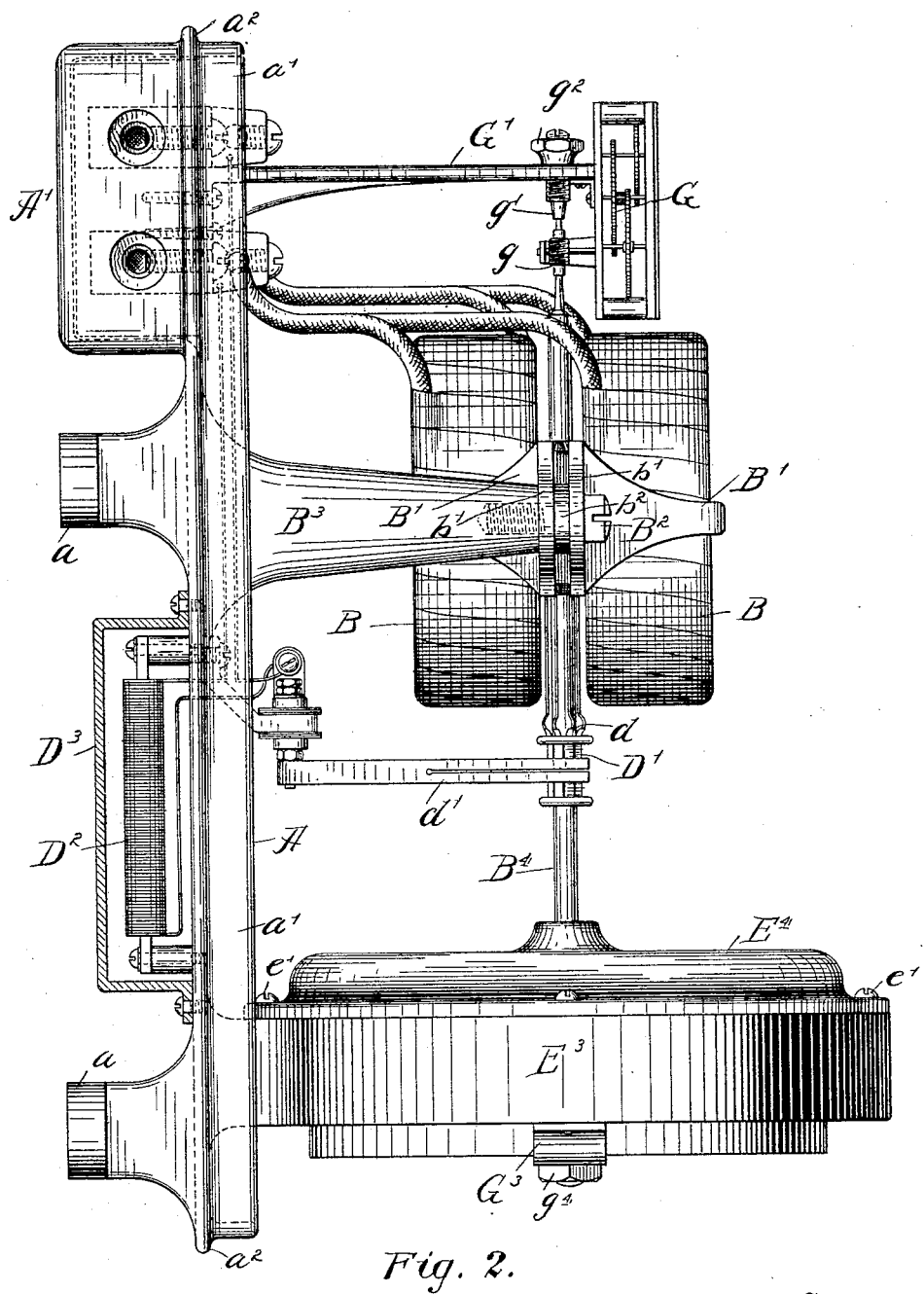
Figure 3:
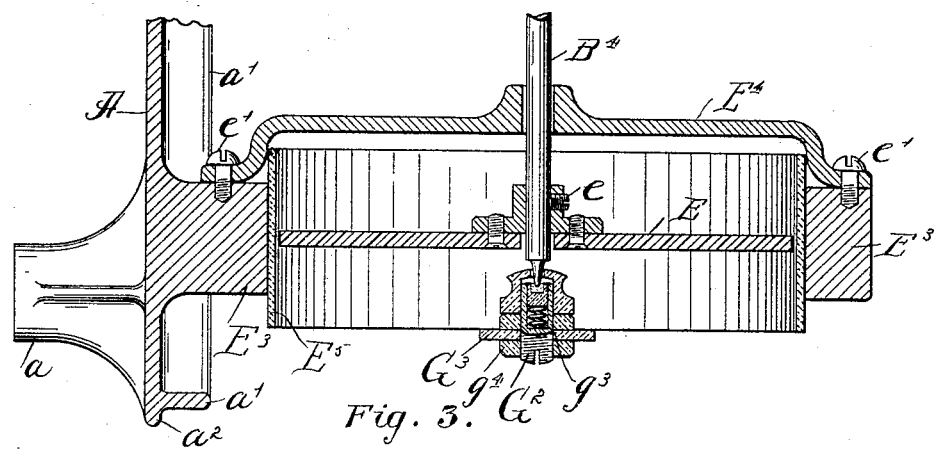
Figure 4:
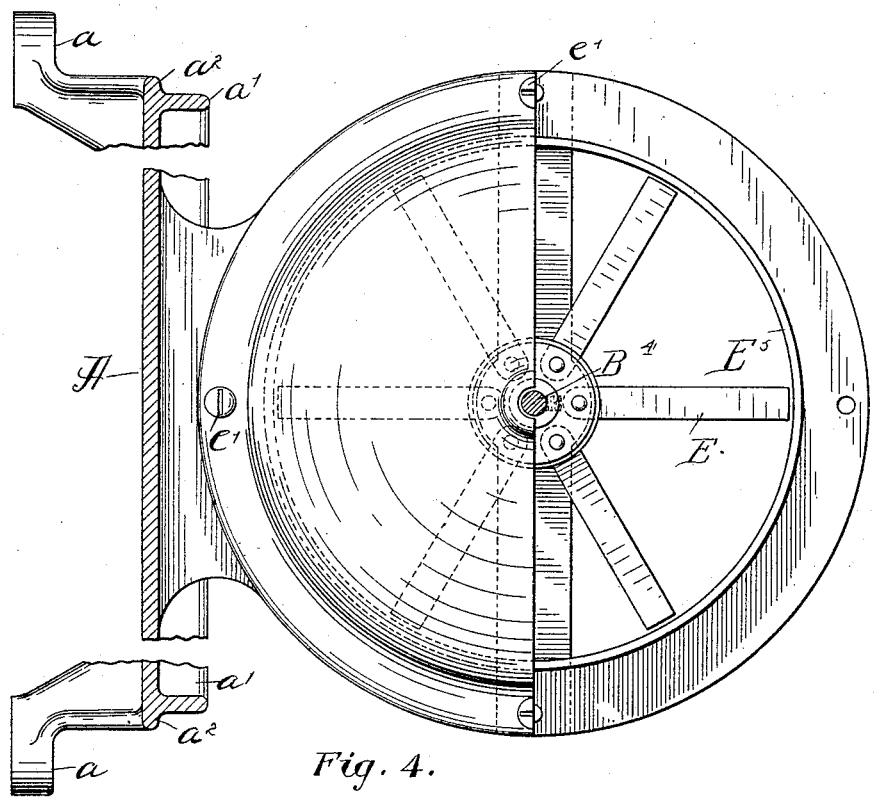
Figure 14:
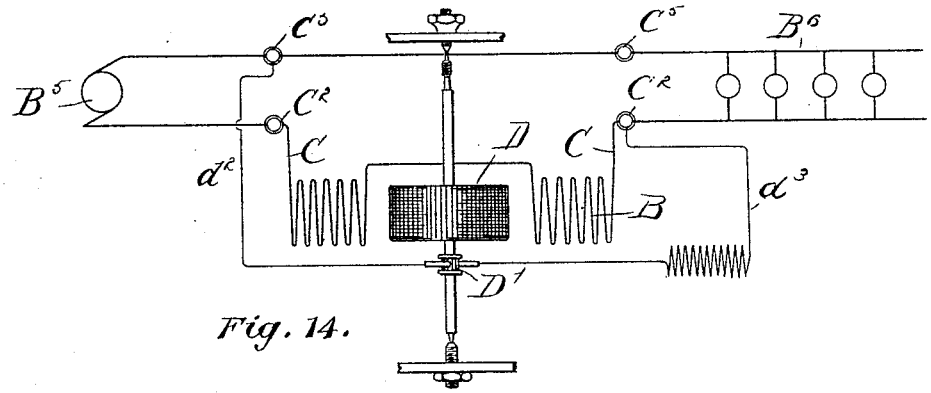

Figure 1 is a front elevation of a meter embodying my invention complete and ready for installation. Fig. 2 is a side elevation thereof, partly in section, to expose the resistance in the armature or volt circuit; Fig. 3, a detail in sectional elevation showing the retarding device or brake, including the magnets, the magnetic shield or keeper, and the bearing for the lower end of the spindle; Fig. 4, a top plan view of said retarding-magnets and shield with part of the cover removed. Figs. 5 to 13 represent alternative forms of the brake or drag or modifications therein, and Fig. 14 is a diagrammatic representation of the connection of the meter in circuit.

In said figures, A indicates the back plate of the meter-frame, formed, in general terms, as a rectangular metallic casting, with feet $a$, by which it is secured to the wall or other support, face-rib $a'$, serving to position and steady the covering box or casing (not shown) and to strengthen and stiffen the frame, edge flange $a^2$, which affords a seat for said box, and pocket A' for the reception of an insulating board or wooden base A² for the binding-posts and integral with or having bolted to its front face the various brackets and other fixed accessories to the active agencies of the meter, as hereinafter referred to.

B represents the series coils, each of which is grasped at opposite sides by the fingers $b$ of individual clamps B', having flanges $b'$ at their inner or meeting edges, outsetting in planes parallel to the planes of their respective coils, so that by means of screw-bolts B², passing through the flanges and through the spacing-washers $b^2$ and into the brackets B³ from the back plate, the coils may be removably secured in place with room between them for the passage of the meter-spindle B⁴, as shown. It often happens that the coils are more or less induced to twist, particularly when wound with large wire, so that they may almost touch the spindle at their tops. By replacing the washers between the clamps with larger ones or substituting wedge-shaped washers the coils are readily opened or separated or "trued." This construction also allows of the coils being taken apart and reassembled with great ease for examination of the armature or in case of repair or otherwise. These coils may be so connected that the current will traverse them in series, and are so shown in the diagrammatic representation in Fig. 14, in which B⁵ stands for the generator or other source and B⁶ for the lamps or other translating devices; but in Fig. 2 they are indicated as coupled in multiple, the coil-terminals C being connected by binding-screws $c$ with one side, C', of the main or working circuit entering through leading-in holes $c'$ and making contact with lower binding-posts C² through binding-screws $c^2$, the other side, C³, of said circuit being brought into the meter through holes $c^3$ and continued across by connecting strip or wire C⁴, extending from one of the upper binding-posts C⁵ to the opposite, and contact being secured by binding-screws $c^4$ and $c^5$ in the respective posts.

Inside of the series coils is located the armature D, secured upon the meter-spindle B⁴ and revoluble therewith. This armature is wound with fine wire, the terminals $d$ of its coils being joined to the segments of the commutator D', fixed upon the spindle beneath the series coils in position to be readily accessible for repairs. Current is supplied to it through the brushes $d'$, connected in series with a resistance D², located behind the back plate and protected by cap D³, and from thence by wires $d^2$ $d^3$ with an upper and lower of the binding-posts at the top of the meter or with one on each side of the circuit, thus bringing the armature in shunt to said circuit or in multiple across the circuit.

Figure 5:
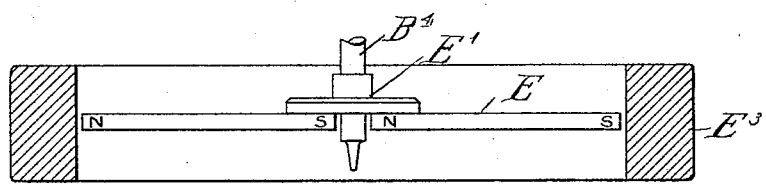
Figure 6:
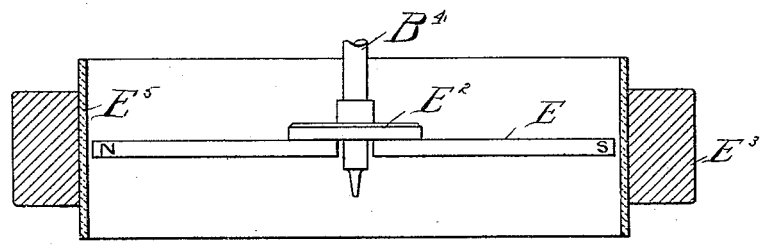
Figure 7:
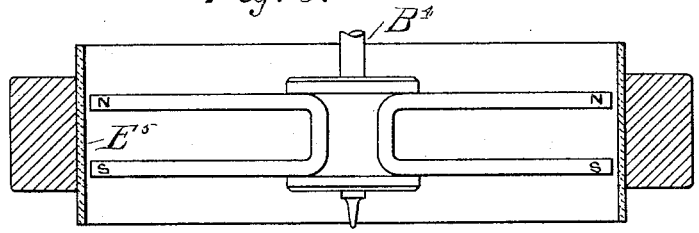
Figure 8:
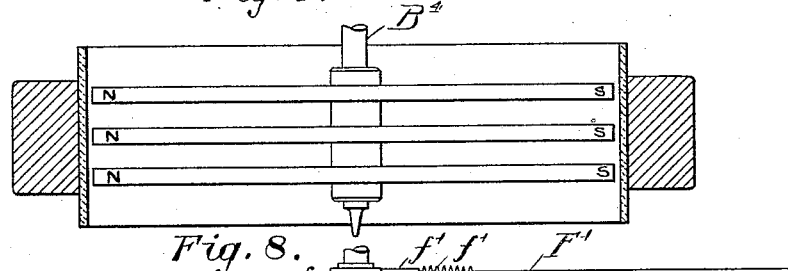

Upon the meter-spindle, beneath the armature-commutator, are secured radiating permanent magnets E, which may be short bar-magnets, as in Fig. 5, extending from a central hub E', of brass, outward, so that one pole of each is at the hub and the other lies in the perimeter described by their revolutions, or may be attached to a magnetic hub E², of iron, for instance, so that the magnetic circuit continues from outer end to outer end, as in Fig. 6, or may be of horseshoe form, as in Fig. 7, arranged either in a horizontal or in a vertical plane, or may extend unbrokenly equidistant on both sides of the hub, as in Fig. 8, and be one or more deep. Again, but a single bar-magnet may be employed, as in Fig. 10, or the magnet may be multipolar, as in Figs. 11, 12, and 13, and in one or several pieces. The hub may be adjustably secured to the spindle by set-screw $e$ or otherwise. Outside of these magnets and in close proximity to the path described by their poles in revolution is mounted a paramagnetic ring E³, of iron, for example, forming an iron-clad low-resistance path. This may be cast upon the back plate of the meter, as shown, or cast or formed separately and bolted thereto, or may be built up of thin sheets of iron, presenting their edges to the poles of the magnets, and make a still better magnetic conductor than cast or annealed iron or steel. When the magnets are at rest, the lines of force emanating from their poles complete their circuit through the inclosing ring, as indicated by dotted lines in Figs. 10 to 12, inclusive, and it then acts as a keeper and conservator of strength, but as soon as they are moved eddy-currents, although small, will be developed in the ring, if the latter is used alone with the magnets, as in Fig. 5, and it forms the retarding element of the brake or drag, in addition to acting as a shield to intercept lines of force from external sources and bar them from reaching the magnets. An iron or other paramagnetic cap or cover E⁴ may bridge the magnet from the spindle to the ring, and, if desired, a second cap or shield may subtend the space beneath to more completely intercept all external lines of force and relieve the magnets from their disturbing influence, and these caps may be detachably secured to the paramagnetic ring by screws $e'$, so as to be lifted or removed to give access to the magnets or other agencies beneath.

Although the iron-clad magnetic circuit or ring alone may be used in connection with the revolving magnets to supply the retarding element, as indicated in Fig. 5, the eddy-currents developed therein are not of such strength as is desirable for the best effects. Therefore I prefer to interpose a stationary continuous ring E⁵ or closed circuit, of copper or aluminium or equivalent metal, in which to generate these eddy-currents. In a normal position, that is, with the magnets at rest, the lines of force from their poles will pass through this intermediate ring and complete their circuit through the exterior iron ring or keeper; but as soon as the magnets begin to revolve the lines are caused to traverse or cut the copper or other intermediate ring or closed secondary and develop eddy-currents therein. The effect is similar to running a dynamo on short circuit, or, as one might say, the induced currents acting upon the lines of force which produce them tend to stop the motion, or, according to Lenz's law, "the induced currents have such a direction that their reaction tends to stop the motion which produces them."

The retardation may be varied by raising or lowering the magnets upon the spindle, by short-circuiting their limbs with an iron wire, by raising or lowering the copper ring in the field, or in any other facile manner that may suggest itself.

Figure 9:
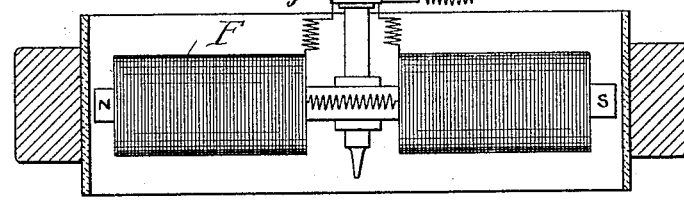
Figure 10:
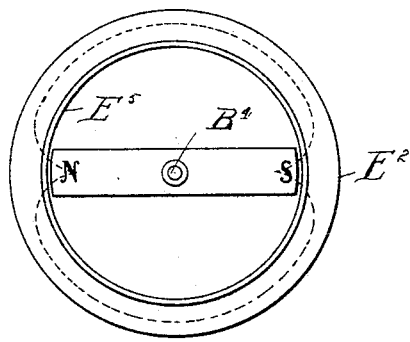
Figure 11:
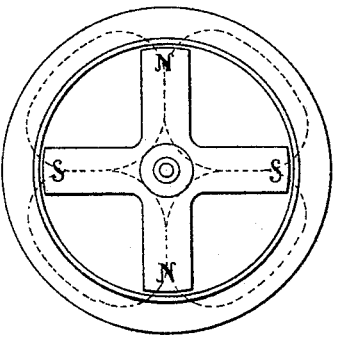
Figure 12:
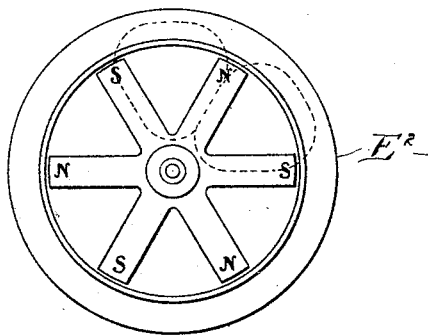
Figure 13:
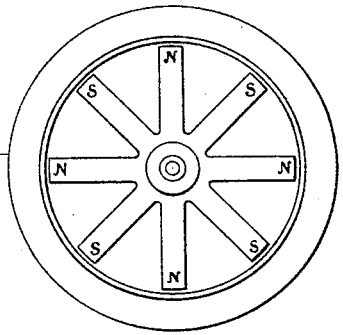

When a very strong field is required in the brake or drag, a revoluble electromagnet F may be employed in connection with the paramagnetic ring, with or without the intermediate ring, as indicated in Fig. 9, taking its current from collector-ring $f$ on the spindle, brushes $f'$, and circuit $F'$, which will include a battery or other source.

The drag produced by this arrangement of parts is very correctly a force proportional to the speed and proportional to the square of the magnetic field. This force is proportional to the product of the field and current, and the current circulating in the copper ring is proportional both to field and speed. The motor part of the meter gives or delivers a torque that is equal to the product of the amperes in the series coils and the electromotive force at the terminals of the armature-circuit, resulting, therefore, in giving a speed varying as the watts or power. Hence with the improved brake the retardation varies exactly as the speed of the motor in watts. This gives a resulting speed which follows a perfectly straight line law.

The revolutions of the armature corresponding with this resulting speed are taken up by the registering-train G from the worm $g$ near the top of the spindle, the latter being held in place at its upper end by the bearing $g'$, threaded through the bracket-arm $G'$, which supports at its front end the registering-train, and by the jam-nut $g^2$, taking over said bearing and binding against the bracket. At its lower end the spindle is stepped in a jewel set into the post $G^2$ and supported upon a spring $g^3$ in a socket in said post for taking up any sudden jar which might otherwise break it. The jewel-post itself is threaded into a supporting-bar $G^3$, secured to the under side of the iron ring or keeper and diametrically across it, and is clamped in adjusted position by jam-nuts $g^4$, as shown.

I do not intend to limit myself to the specific construction of the brake herein described, since it is obvious that various modifications in the arrangement of magnets and of rings or keeper may be introduced without departing from the scope of my invention, as, for instance, the magnets and outer ring may be stationary while the inner or intermediate ring revolves with the spindle; but,

Having thus described my invention in the best form known to me, what I claim, and desire to secure by Letters Patent, is—

1. In a drag or brake, the combination with radially-disposed magnets, one or more, of a paramagnetic ring embracing their poles and in close proximity thereto, and means for inducing relative motion between said ring and magnets in the plane of the latter.

2. In a drag or brake, the combination with radially-disposed magnets, one or more, of a paramagnetic ring surrounding their outer poles, an intermediate ring of copper or equivalent material and means whereby relative rotary motion is imparted between the magnets and intermediate ring.

3. In a drag or brake, the combination with rotating radial magnets, one or more, of a surrounding fixed paramagnetic ring serving as a shield against external lines of force and as an element of the retarding agencies.

4. In a drag or brake, the combination with rotating radial magnets, one or more, of a surrounding fixed paramagnetic ring, and an intermediate ring of copper or equivalent material.

5. In a drag or brake, the combination with the meter-spindle, of one or more permanent magnets fixed thereto and outsetting radially therefrom, and a surrounding stationary paramagnetic ring fixed in the plane of the rotation of said magnets and normally serving as a keeper.

6. In a drag or brake, the combination with one or more rotating permanent magnets fixed radially to their spindle, of a surrounding stationary paramagnetic ring normally serving as a keeper, and an intermediate stationary ring of copper or equivalent material for the generation of eddy-currents when the magnets are revolving.

7. In a drag or brake, the combination with one or more radial magnets, of a paramagnetic ring surrounding their outer poles, and a paramagnetic cover shielding the interannular space and magnets therein.

8. In a drag or brake, the combination with one or more radial magnets, and a paramagnetic ring surrounding their poles, of the detachable paramagnetic cover secured to said ring.

9. The combination with the meter-spindle, of a multipolar permanent magnet having radiating limbs, and a fixed paramagnetic ring surrounding the outsetting poles of said magnet in close proximity thereto.

10. The combination with the meter-spindle, of a multipolar permanent magnet having radiating limbs, a fixed paramagnetic ring surrounding the outsetting poles of said magnet in close proximity thereto, and a ring of copper or equivalent material, forming a closed circuit, interposed between said paramagnetic ring and the poles of the magnets.

11. The combination with the field-coils and armature, of the spindle sustaining said armature, the outsetting brake-magnets, one or more, and the paramagnetic ring surrounding the outer poles of said magnets.

12. The combination with the field-coils and armature, of the spindle sustaining said armature, the outsetting brake-magnets, one or more, the paramagnetic ring surrounding the outer poles of said magnets, and the intermediate ring of copper or equivalent material.

13. The combination with the field-coils and armature, of the spindle sustaining said armature, the outsetting brake-magnets, one or more, the paramagnetic ring surrounding the poles of said magnets, and the paramagnetic cover shielding the space between the spindle and said ring.

14. The combination with the spindle and with the series coils, of the individual clamps for each series coil, constructed with outsetting flanges, the screw-bolts passing through said flanges and securing the clamps to the supporting-brackets, and the washers interposed between said flanges.

15. The combination with the spindle and the magnets which it supports, and with the surrounding paramagnetic ring, of the jewel-post in which said spindle is stepped, and the supporting-bar for said post, secured beneath and to said ring and diametrically thereof.

THOMAS DUNCAN.

Witnesses:
EDWARD A. BARNES,
CHAS. C. MILLER.